Figure 1:
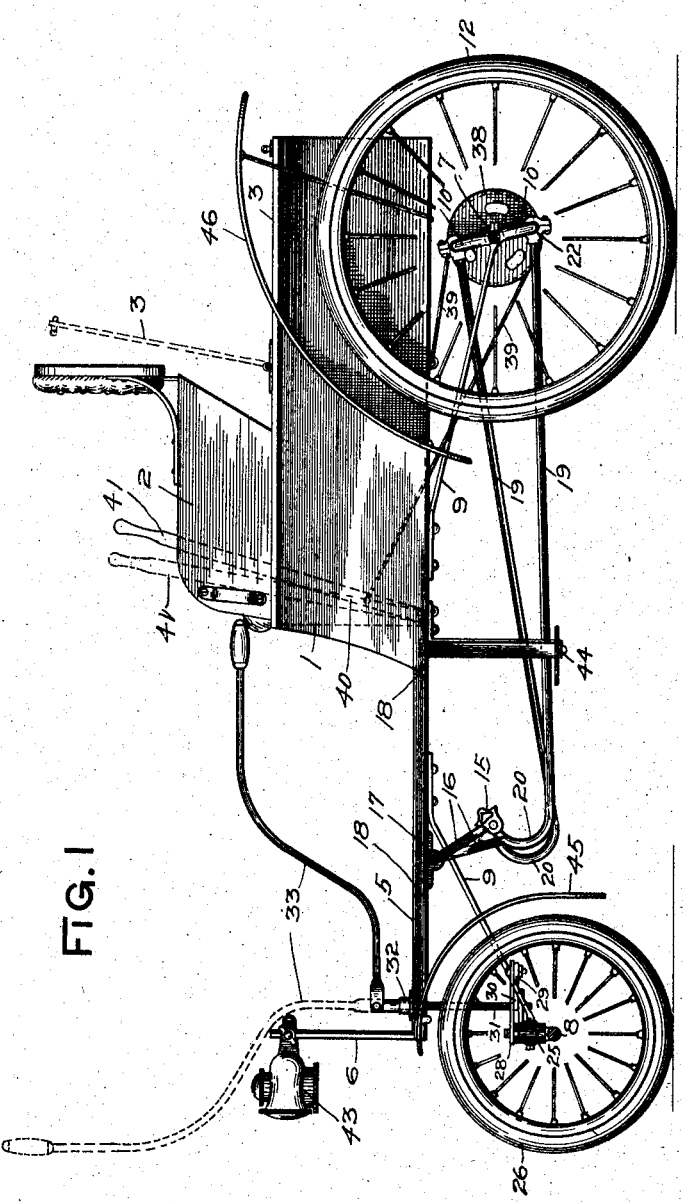

No. 781,098. PATENTED JAN. 31, 1905.
J. D. SCHOOLEY.
FOOT POWER VEHICLE.
APPLICATION FILED AUG. 31, 1903.

2 SHEETS—SHEET 1.

Witnesses
J. R. Keller
Robert C. Totten

Inventor
John D Schooley
By Kay Totten & Winter
Attorneys

No. 781,098. PATENTED JAN. 31, 1905.
J. D. SCHOOLEY.
FOOT POWER VEHICLE.
APPLICATION FILED AUG. 31, 1903.
2 SHEETS—SHEET 2.
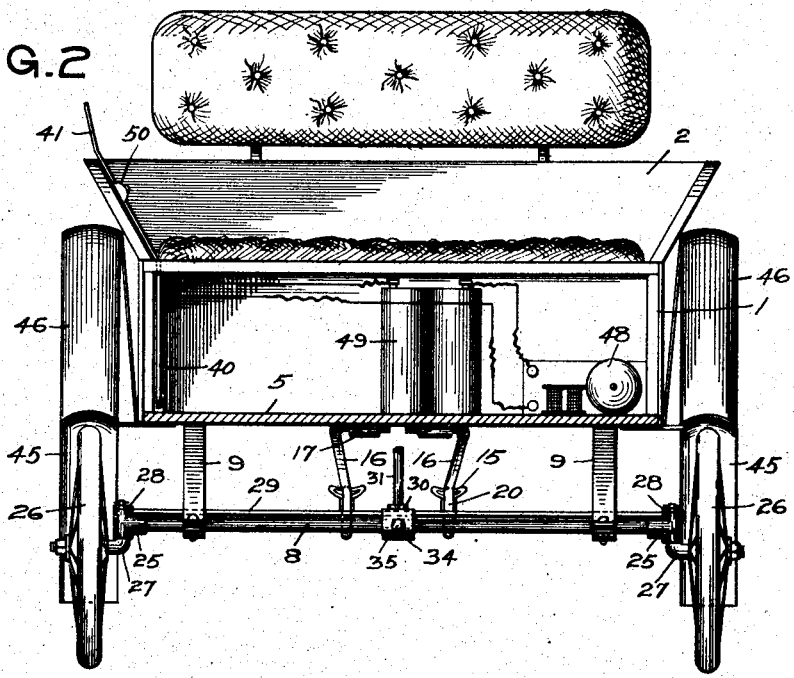
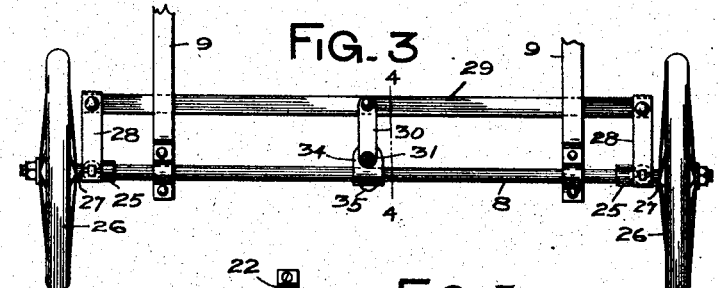
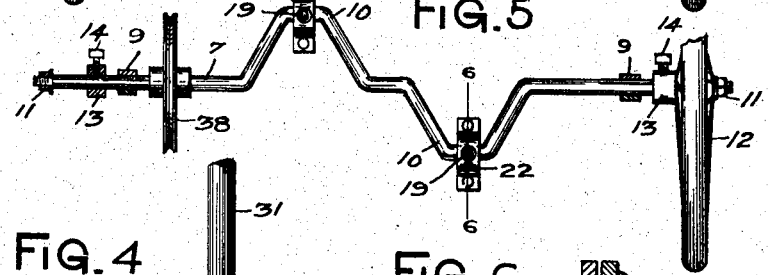
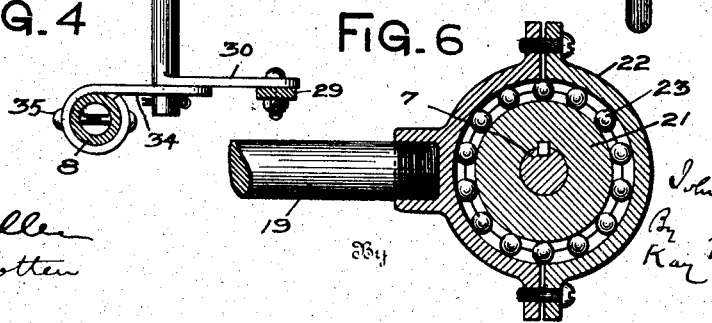

No. 781,098. Patented January 31, 1905.

UNITED STATES PATENT OFFICE.

JOHN D. SCHOOLEY, OF ALLEGHENY, PENNSYLVANIA.

FOOT-POWER VEHICLE.

SPECIFICATION forming part of Letters Patent No. 781,098, dated January 31, 1905.

Application filed August 31, 1903. Serial No. 171,354.

*To all whom it may concern:*

Be it known that I, JOHN D. SCHOOLEY, a resident of Allegheny, in the county of Allegheny and State of Pennsylvania, have invented a new and useful Improvement in Foot-Power Vehicles; and I do hereby declare the following to be a full, clear, and exact description thereof.

My invention relates to foot-power vehicles, such as children's wagons and the like; and its object is to provide a vehicle of this character propelled by pedals or similar means which resembles an automobile or motor-vehicle in its general design and construction and which is so constructed that it can be cheaply manufactured to bring it within the price of this character of articles.

In the accompanying drawings, Figure 1 is a side view of a wagon constructed according to my invention. Fig. 2 is a front view of the same, the body being sectioned just back of the dashboard and the front board underneath the seat being removed. Fig. 3 is a detail plan view of the steering-gear. Fig. 4 is a transverse section on the line 4 4, Fig. 3. Fig. 5 is a detail side elevation of the rear axle and driving means; and Fig. 6 is a transverse section of the same on the line 6 6, Fig. 5.

The vehicle is of the four-wheel type and is provided with the body 1, which is made to resemble the body of certain types of automobiles. This body at its rear portion is formed practically as a box, having thereon the seat 2 and being provided with a hinged cover 3 to the rear of the seat. The forward part of the body is formed as a platform 5, having at its forward end the dashboard 6.

The vehicle is provided with four wheels, and consequently there are two axles—a rear axle 7 and a front axle 8. These axles are mounted in the outer lower ends of spring-arms 9, the upper inner ends of which are suitably connected to the lower side of the body. These arms 9 are made of spring-steel bars or bands of sufficient strength to carry the load, but having sufficient resiliency therein to enable the same to act as springs for the body. These spring-arms are very simple in construction, and therefore cheap to manufacture. The rear axle 7 is rotatably mounted in bearings formed in the outer ends of the rear spring-arms 9, said axle being formed of a round metallic bar or tube of the proper size, which is bent so as to provide the same with two crank portions 10. The outer ends of this rear axle are threaded to receive the nuts 11 for holding the wheels 12 in place. To prevent the wheels slipping inwardly, a collar or nut 13 is secured thereto by a set-screw 14. This obviates the necessity of reducing the end of the axle to form the necessary shoulder to prevent the wheel from slipping inwardly.

To propel the vehicle, I provide suitable pedals or the like 15, which are formed on the lower ends of arms 16, pivotally mounted in hangers 17, secured to the lower face of the vehicle-body, and in order to permit access to said pedals the floor of the body in front of the seat is provided with an opening (indicated by dotted lines 18, Fig. 1) which will permit the user to place his feet on the pedals. These pedals are connected, by means of rods 19, to the crank portions 10 of the rear axle, these connecting-rods being provided at their forward ends with the curved portions 20, so as to give ample clearance for the feet of the user, and having their rear ends connected to the crank portions, preferably by a ball-bearing connection. This latter can be accomplished in any suitable way, such as securing to the axle the grooved disk 21 and securing to the rear end of the connecting-rod 19 a grooved separable collar 22. The balls 23 are held in the grooves of the disk and collar.

The front axle 8 is rigidly secured in the outer ends of the front spring-arms 9. This axle is an ordinary gas-tube, and onto its ends are screwed ordinary plumbers' T's 25, thus providing the ends of the axles with vertical openings in very cheap and effective manner. Each T has a vertical opening and also an opening on one side substantially midway of the vertical portion of the T and intersecting the vertical opening. The ends of the axle are screwed directly into the side openings of the T's. The front wheels 26 are mounted on journal extensions or skeins 27, the latter having their inner ends bent upwardly and extending through the vertical openings of the T's 25. The upper ends of these vertical extensions are flattened or squared and have secured thereto arms 28, the arms for the opposite wheels being connected by the cross-bar 29. Connected to this cross-bar 29 is the outer end of an arm 30, formed on or secured to the vertical steering-post 31, the latter extending upwardly through a sleeve 32, secured to the bottom of the vehicle-body and having secured to its upper end the steering arm or lever 33, the latter preferably being hinged to the steering-post, as shown in Fig. 1, so that it can be swung out of the way. The post 31 projects but a short distance above the floor of the body. If the post projected farther above the floor, it would either have to be made stronger or else separate braces provided therefor. This is not necessary with the arrangement shown. The lever 33 is comparatively long and extends across the opening in the floor of the body and is also bent upwardly, so that the end thereof is close to and as high as the seat. The lower end of this steering-post is stepped in a bracket or clip 34, which consists of a piece of strap metal bent around the front axle 8 and secured thereto by the rivet 35, the horizontally-projecting arm of said bracket being provided with an opening for receiving the lower end of the steering-post 31.

The vehicle is also provided with a brake, that shown in the drawings comprising a disk 38, preferably grooved and secured to the rear axle. Around this disk passes the friction-brake band 39, having one end secured to the vehicle-body and its opposite end secured to a lever 40, which is pivoted to the vehicle-body preferably inside the same and projects up through a slot in the seat and has its operating end 41 in convenient position for the use of the rider. The vehicle will also be provided with the usual accessories of a motor-vehicle, such as a lamp 43, secured to the dashboard, the steps 44, and the mud-guards 45 and 46, suitably secured to the vehicle-body and projecting over the front and rear wheels, respectively. I also provide the vehicle with suitable alarm mechanism and show for this purpose an electric bell 48, adapted to be energized from a battery 49, said bell and battery being placed under the seat and the circuit-wires thereof leading up to a suitable circuit-closer, such as the push-button 50, secured to the seat.

The vehicle shown and described, it will be observed, is adapted to be propelled by any child, and at the same time it is so constructed as to very closely resemble a motor-vehicle and is provided with the usual accessories of such vehicles. The different parts are so constructed that it will be possible to build the vehicle within the price that can be usually demanded for this class of articles.

Certain parts of the structure can be modified without departing from the spirit of my invention—such, for instance, as using operating-levers in place of the pedals 15—and it would also be possible to have the pedals secured directly to a rotary shaft which would be connected to the rear axle by sprocket-and-chain gearing.

What I claim is—

1. In a foot-power vehicle, the combination of a body, two axles mounted underneath the same, a pair of wheels on each axle, the front axle being fixed with reference to the body, plumbers' T's screwed onto the ends of said axle, said T's each having a vertical opening and an opening on one side thereof substantially midway of the vertical portion of the T, the ends of the axle being screwed directly into the side openings of the T's, journal extensions for the front wheels provided with vertical portions projecting through the vertical openings in the T's and having square upper ends, arms on said square ends, a steering-lever, and connections from the same to said arms.

2. In a foot-power vehicle, the combination of a body, a rear axle and wheels mounted thereunder, a front axle rigidly mounted under the body, journal extensions on the ends of said front axle, arms connected to said journal extensions, a vertical steering-post, connections between the same and the arms on the journal extensions, and a strap encircling the front axle and secured thereto and serving as a step for the lower end of said steering-post.

3. In a foot-power vehicle, the combination of a body having a floor provided with an opening, a dashboard at the forward end of the floor, a box to the rear of the opening in said floor, a seat on the forward end of the box, guiding mechanism mounted underneath the opening in the floor, two axles mounted underneath the body, a pair of wheels on each axle, connections from the driving mechanism to the rear pair of wheels, skeins for the forward pair of wheels hinged to the ends of the axle, a steering-post extending through the floor in front of the opening therein and projecting but a short distance above the floor, a lever hinged to the upper end of said steering-post and projecting across the opening in the floor and being bent upwardly with its end close to and as high as the seat, and connections between the lower end of said steering-post and the hinged axle-skeins.

In testimony whereof I, the said JOHN D. SCHOOLEY, have hereunto set my hand.

JOHN D. SCHOOLEY.

Witnesses:
ROBERT C. TOTTEN,
F. W. WINTER.